United States Patent [19]

Cook

[11] 3,821,801

[45] June 28, 1974

[54] AUTOMATIC SKEW CORRECTOR HAVING TENSION CONTROL

[75] Inventor: Thorsten P. Cook, Pound Ridge, N.Y.

[73] Assignee: Goldmark Communications Corporation, Stamford, Conn.

[22] Filed: May 17, 1973

[21] Appl. No.: 361,132

[52] U.S. Cl. .................................... 360/70, 360/73

[51] Int. Cl.... H04n 5/78, G11b 15/43, G11b 15/52

[58] Field of Search ...................... 178/6.6 A, 6.6 P; 179/100.2 T

[56] References Cited

UNITED STATES PATENTS

| | | | |
|---|---|---|---|
| 3,071,644 | 1/1973 | Olive | 178/6.6 P |
| 3,213,193 | 10/1965 | Konishi | 178/6.6 P |
| 3,345,457 | 10/1967 | MacLeod | 178/6.6 P |
| 3,535,441 | 10/1970 | Grace | 178/6.6 P |
| 3,636,252 | 6/1972 | Kowal | 178/6.6 P |
| 3,662,099 | 5/1972 | Crosno | 178/6.6 P |
| 3,705,840 | 12/1972 | Kosugi | 178/6.6 P |

*Primary Examiner*—Raymond F. Cardillo, Jr.
*Attorney, Agent, or Firm*—St. Onge Mayers & Reens

[57] ABSTRACT

A skew corrector is described whereby the tension of the video tape in a video tape playback device is automatically corrected. The skew corrector is particularly suitable for insertion in existing video tape playback devices which do not include automatic skew correction. A minimum amount of physical modification is required whereby a composite video signal is taken from the video playback device and processed to remove horizontal sync and vertical sync signals. An inhibit network is employed to prevent, during video field changes, the operation of a horizontal synchronization circuit with which a pulse generator is phase locked to the horizontal sync pulses. A vertical sync actuated sample and hold network is employed to store a tape tension error signal used to vary the tape tension to remove visual skew problems.

10 Claims, 2 Drawing Figures

AUTOMATIC SKEW CORRECTOR HAVING TENSION CONTROL

FIELD OF THE INVENTION

This invention relates to an apparatus for correcting the skew errors in a helical scan video tape playback apparatus. More specifically, this invention relates to an apparatus for varying the tension on a video tape in a video tape playback apparatus to obtain proper field registrations.

BACKGROUND OF THE INVENTION

In the field of video tape recorders and playback devices recording and playback heads are employed which move at a rapid speed relative to the video tape to recapture the high frequency video signals. The heads are located around a drum which is rotated at such speed that as one video playback head completes the scan of a video track, the next head commences the scan of a new track. In one type of video tape playback device, a helical scan of the video tape is made so that the tape traversal of each head results in the generation of one field of a video signal frame. A head switch signal is produced to properly connect to the output of that particular head which is scanning the video tape.

A problem encountered with the playback of video tapes involves the variable stretching of the tape as a result of temperature, humidity or other physical variations. These tape tension variations cause a time displacement of the video picture information and are particularly noticeable as skew errors in helical scan video tape playback devices. The tape distortions cause sequential fields to vary in length.

Many patents have been issued describing electronic video tape playback devices which automatically correct skew errors by varying the tension of the video tape. For example, in the U.S. patent to Olive 3,071,644, phase errors between horizontal line sync pulses of different tracks are detected and the sensed error signal is used to vary the tape tension by controlling the pressure on the video tape on the playback head. U.S. Pat. No. 3,213,193 describes another video playback device to correct for tape tension variations.

In U.S. Pat. No. 3,535,441 to Grace a tape tension control for a helical scan video tape recorder is described. A voltage controlled oscillator follows the frequency of horizontal line pulses from a video playback head. The phase difference between the oscillator and the horizontal pulses is detected and the phase error sampled at intervals determined by a video head switch signal. The phase error signal includes both high and low frequency phase errors which are respectively applied to control the speed of the tape and its tension.

In the U.S. Patent to MacLeod 3,345,457, the tension of a video tape is varied to avoid skew errors by controlling a brake coupled around a tape supply reel. A tension error signal is produced with an adjustable frequency pulse oscillator which follows the frequency of horizontal line sync signals. A first sample and hold circuit is actuated by the horizontal line pulse signals to store their phase error with the oscillator. This error signal is applied through a time averaging network to bring the oscillator to the same frequency as that of the horizontal line pulses.

The error signal is also applied, after isolation, to a second sample and hold network which is actuated by a head signal representative of the time when the video outputs from respective heads is switched for track changes. This second sample signal is then used to control the tape tension to reduce the phase error signal to a minimum value.

These tape tension control devices as described in the prior art are preferably initially incorporated as a part of the overall control for the video tape playback/recorder. In certain instances, however, such automatic tension control devices may be deleted by reason of high speed correction capabilities of video television displays or receivers designed to operate with the video tape playback/recorder. When a video tape playback apparatus without automatic skew correction is used with a slowly correcting T–V receiver, the visual skew errors due to tape tension variations become discernable and must be removed.

For example, presently video tape playback/recorders are being marketed by the Sony Corporation without automatic tape tension control. These devices operate very well with fast responding Sony manufactured T-V receivers or displays, i.e., substantially free from skew errors. However, when such video tape playback/recorder is used with a slower responding television receiver or display as is commonly employed in the U.S., skew errors are likely to arise and become visually pronounced.

When a video tape playback/recorder does not include automatic skew correction, a manual tape tension adjuster is still provided to accommodate different operating conditions. However, in practice, such manual adjustment is not sufficient and continual manual adjustments are needed to operate with a slow video responsive television display.

SUMMARY OF THE INVENTION

In a video tape tension controller in accordance with the invention, the skew errors produced by a helical scan video tape playback/recorder, which does not normally include an automatic skew correction capability, are substantially eliminated with a minimum amount of physical modification. A composite video signal generated in the video tape playback/recorder is applied to the tape tension controller which employs circuitry to generate a tape tension error signal.

The tape tension error is generated by stripping vertical and horizontal sync signals from the composite video. The horizontal sync singals are applied through an inhibit network to a horizontal line pulse control network for maintaining a voltage controllable pulse generator in synchronization with the horizontal sync pulses. The inhibit network recognizes the equalizing pulses at the end of the vertical field and precludes further synchronization of the pulse generator until the next horizontal line occurs. The pulse generator free runs during the inhibit action under control by the last horizontal sync error signal.

Upon the occurrence of the vertical sync pulse, the horizontal sync error signal is sampled and a tape tension error signal is produced. The tape tension error signal is amplified and applied to a solenoid which is coupled to a tape tension controller to vary tape tension in a direction towards a minimum tape tension error for a minimum of skew error.

An advantage of an automatic skew correction controller in accordance with the invention resides in its convenient application to available video tape playback devices with a minimum of physical changes. A single line which includes both horizontal and vertical sync signals is taken from the device to substantially eliminate skew errors. A manual tension adjuster is then automatically varied with a solenoid and a simple linkage to form a practical skew error corrector.

It is, therefore, an object of the invention to provide a skew corrector which is conveniently installed in existing video tape playback devices.

It is a further object of the invention to provide an automatic skew control for a video tape playback device.

BRIEF DESCRIPTION OF DRAWINGS

These and other advantages and objects of the invention will be understood from the following description of a preferred embodiment in accordance with the invention and described in conjunction with the drawings wherein.

DETAILED DESCRIPTION OF DRAWINGS

Figure 1:
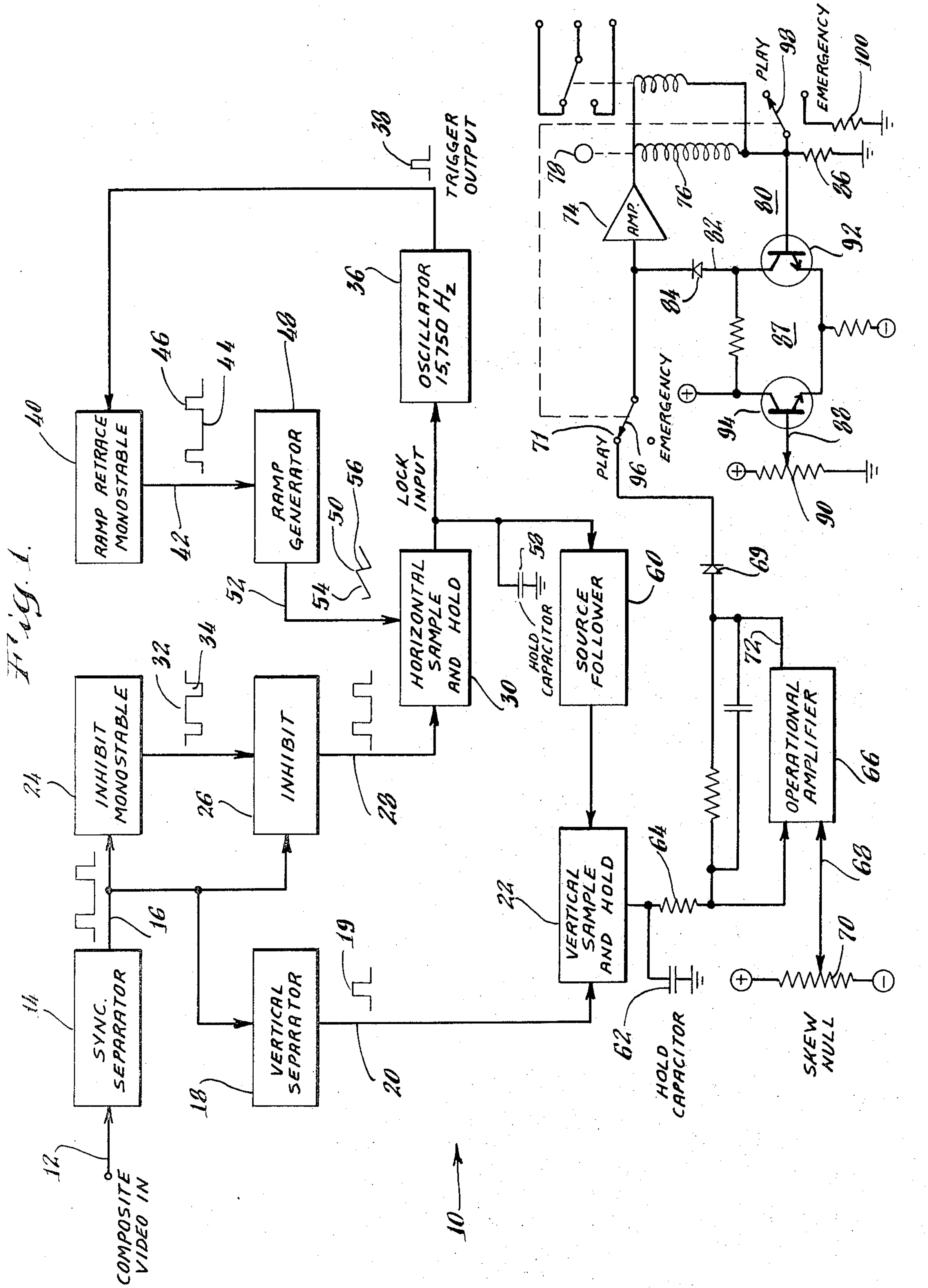
FIG. 1 is a block diagram view of a skew corrector in accordance with the invention.

With reference to FIG. 1, a block diagram for a skew correction circuit 10 in accordance with the invention shown. An input line 12 carries a composite video signal such as detected by heads (not shown) in a helical scan video tape playback device (not shown). The composite video signal is applied to a sync separator 14 whose output line 16 carries both horizontal and vertical sync pulses.

A vertical sync separator 18 removes the vertical sync pulses such as 19 and applies these on line 20 to a vertical sample and hold network 22. The sync pulses from sync separator 18 are also applied to a mono stable network 24 and an inhibit circuit 26 which produces horizontal sample pulses on output line 28 to a horizontal sample and hold network 30. Monostable network 24 produces output pulses 32 of about 52 microsecond duration at intervals of 63 microseconds, i.e., the duration of a horizontal line scan. For the duration of the pulse 32, circuit 26 prevents any of the sync pulses on line 16 from activating the sample and hold circuit 30. During the 11 microsecond interval 34, however, the sync pulses on line 16 are allowed to pass through to activate sample and hold network 30.

Inhibit monostable 24 is of the type whereby the application of another input pulse on line 16, before the expiration of output pulse 32, results in a corresponding increase in the length of pulse 32. Thus, during vertical retrace when the equalizing sync pulses on line 16 occur at twice the usual rate for normal horizontal sync pulses, an increase in the length of pulse 32 arises. The increased width of pulse 32 has a duration substantially equivalent to the time occupied by the equalizing pulses and the normally serrated vertical sync pulse. Hence, the sync pulses on line 16 are inhibited from activating sample and hold circuit 30 for a time period extending on both sides of the vertical sync pulse.

A voltage variable frequency pulse generator 36, which operates at the nominal horizontal video line frequency of 15,750 hertz, produces narrow output pulses 38. Pulses 38 are applied to a ramp retrace monostable network 40 which produces on line 42, pulses 44. Pulses 44 are 53 microseconds long and are separated by 10 microsecond long horizontal retrace pulses 46. Line 42 drives a ramp generator 48 which produces a ramp waveform 50 on output line 52. Waveform 50 is formed of a horizontal line sweep ramp 54 and a retrace ramp 56. The horizontal line sweep ramp 54 is equal in time (53 microseconds) to the duration of a horizontal line sweep pulse 44 while ramp 56 is equal in duration to retrace pulse 46. Waveform 50 is applied to horizontal sample and hold network 30 to be sampled during the retrace ramp 56 by the pulses on line 28.

Each time horizontal sample and hold network 38 is actuated by a sampling pulse on line 28, a voltage representative of the value of ramp 56 at that time is stored as a horizontal error signal on capacitor 58 which retains the voltage charge.

The sampled error voltage on capacitor 58 is used to vary the frequency of oscillator 36 in a direction which drives the error signal on capacitor 58 to a minimum value. Hence, effectively oscillator 36 is synchronized and phaselocked to the horizontal sync pulses and any error voltage on capacitor 58 becomes indicative of the timing difference between successive horizontal sync pulses. The response speed of the synchronization loop for pulse oscillator 36 is slow in comparison with the occurrence of the horizontal sync pulses on line 28. Thus, approximately 15 horizontal sync pulses are needed to bring pulse oscillator 36 in phase with the horizontal sync pulses in the composite video signal. Hence, at the end of a field when a head switch occurs, the error signal stored on capacitor 58 is representative of a change in tension of the video tape.

The error voltage on capacitor 58 is coupled through a high input impedance and low output impedance circuit 60 to drive vertical sample and hold network 22. The latter network 22 is sampled by the vertical sync pulses 19 on line 20 to store a field timing error voltage on a vertical hold capacitor 62.

The error voltage on capacitor 62 is stored at a time following the storage on capacitor 58 of a horizontal timing error. Since a switching between video heads occurs about six horizontal line periods before vertical sync pulse 19, the actuation of sample and hold network 22 causes storage of a field timing error signal on a capacitor 62.

This field timing error signal is indicative of the tape tension variations and is applied through a resistor 64 to a differential operational amplifier 66. A reference or skew null signal is applied on input line 68 from a potentiometer 70 coupled between positive and negative voltage sources. The output on line 72 from amplifier 66 carries the amplified difference between the skew-null reference signal and the field timing error signal stored on capacitor 62.

The output of amplifier 66 is then coupled through a suitable power amplifier 74 to drive a rotary solenoid 76. Solenoid 76, in turn, is linked to a brake 78 coupled around the brake 78 coupled around the spindle of a video tape supply reel (not shown).

A network 80 provides a minimum torque signal on output line 82 which is coupled through a diode 84 to the input of amplifier 74. Network 80 assures a minimum torque producing current through solenoid 76 to maintain brake 78 effectively operative on the tape supply reel.

Network 80 senses the current through solenoid 76 with a small series connected resistance 86 (the resistance being about several ohms). The voltage developed across resistor 86 is compared by a comparator circuit 87 with a reference signal developed on a wiper 88 of a potentiometer 90 connected between a voltage source and ground. The reference signal on wiper 88 represents a desired minimum torque current level for solenoid 76.

During normal operations, when the output signal on line 72 provides a torque producing signal which is above the minimum reference level as set by wiper 88, transistor 92 of comparator 87 conducts and transistor 94 is cut off. With this condition diode 69 is forwardly biased and diode 84 reverse biased.

When the solenoid current is reduced under the control of vertical error signal on line 72 and drops below the reference level on wiper 88, transistor 94 conducts and transistor 92 is cut off. With this condition, the potential of comparator output line 82 is permitted to rise and supply a drive signal to amplifier 74 to prevent the solenoid current from dropping below the desired minimum level.

Switch 71 provides an emergency function by which skew control is interrupted with a first pole 96 coupled in series between line 72 and amplifier 74. A second pole 98 of switch 71 is provided to couple a resistor 100 in parallel with resistor 86 in the emergency position. This parallel connection by pole 98 effectively increases the desired minimum torque exerted by solenoid 76 on brake 78.

Figure 2:
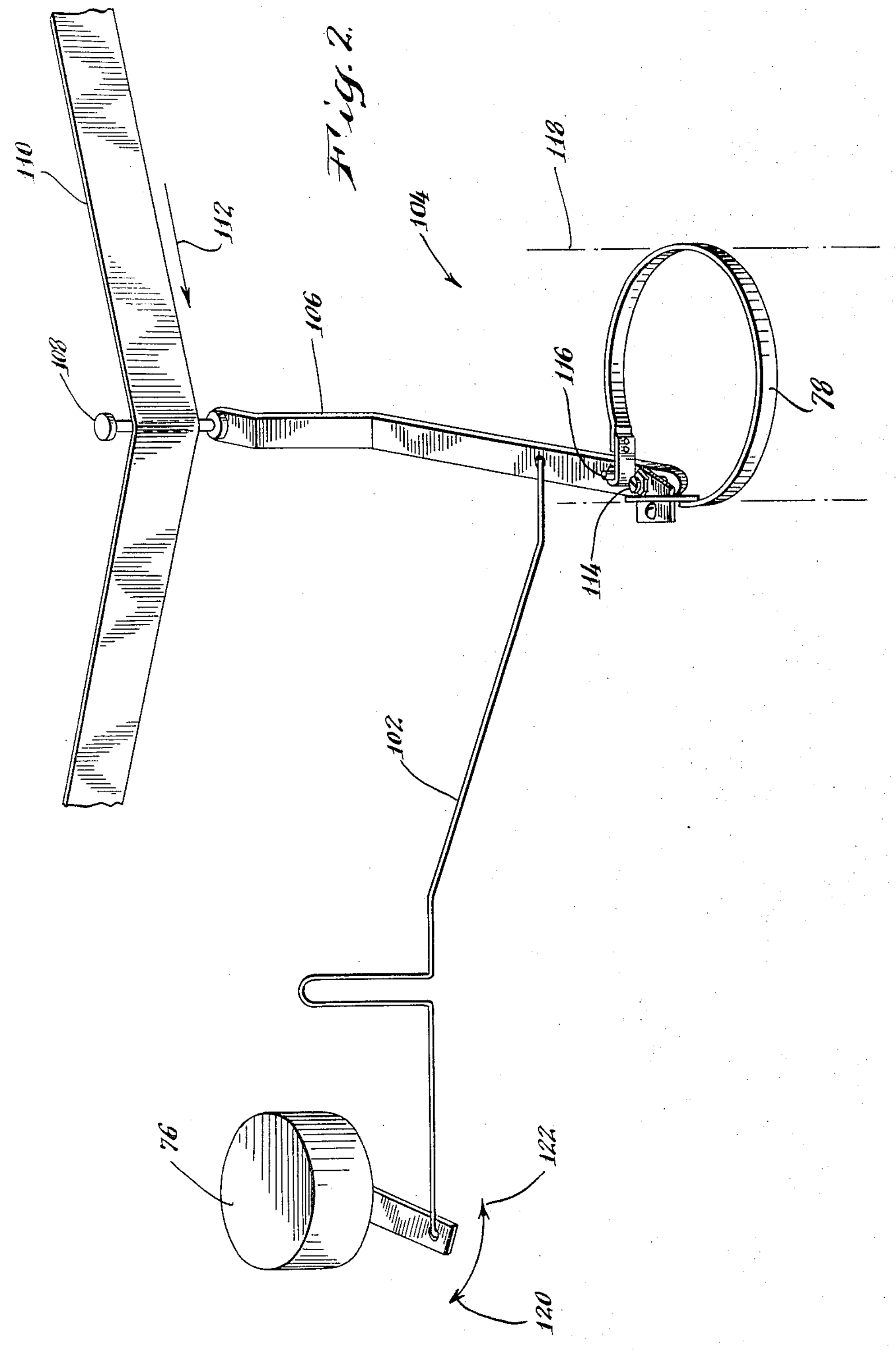
FIG. 2 is a partial perspective view of mechanical components employed to install a skew corrector in accordance with the invention in a video tape playback device.

FIG. 2 shows rotary solenoid 76 connected through a lever arm 102 to a conventional manual tape tension control device 104 present in available video playback devices. Tension device 104 includes a video tape coupled tension arm 106 which carries a tape guide 108 enabling a video tape 110 to move in the direction of arrow 112. Tension arm 106 is pivotly mounted at 114 and connected with a pin 116 to supply reel brake 78 which, in turn, has one end affixed to pivot 114.

Brake 78 surrounds a supply reel spindle such as suggested by dotted lines 118 to control the latter's rotational speed and thus the tension of tape 110 as it is removed from its supply reel. Thus a clockwise movement in the direction of arrow head 120 of rotary solenoid would tighten the brake against the supply spindle causing a corresponding increase in the tension of tape accompanied by a slight stretching. The increased tension lengthens tape 110 to correspondingly increase the time duration of a video field.

In a similar manner, a counterclockwise movement of rotary solenoid 76 in the direction of arrow head 122 reduces tape tension and correspondingly shortens the time duration of the video field.

Having thus described a skew corrector in accordance with the invention, its advantages may be appreciated. The skew corrector may be conveniently installed in existing video tape play-back devices with very little physical modifications. The inhibiting of horizontal sampling during the occurrence of equalizing pulses at the end of each video field precludes the generation of extensive errors in the tension controller.

What is claimed is:

1. A skew corrector for a video tape playback device comprising means responsive to a composite video signal generated within the video tape playback device for producing separated horizontal and vertical sync pulses;

a variable frequency pulse generator having a nominal frequency commensurate with the repetition rate of the horizontal sync pulses;

means actuated by horizontal sync pulses and including a horizontal sample and hold network for generating a horizontal error signal representative of the difference in phase between the pulse generator and the horizontal sync pulses, said error signal being coupled to the pulse generator to vary the phase thereof in a direction tending to drive said horizontal error signal to a minimum value;

means interposed between the horizontal sync pulses and the means for generating a horizontal error signal to inhibit operation of the horizontal sample and hold network during video field changes;

means actuated by the vertical sync pulses for sampling said horizontal error signal and produce an output signal representative of a tension error in the video tape; and means responsive to the output signal for varying the tension in the video tape in a direction tending to drive the output signal to a minimum value.

2. The skew corrector as claimed in claim 1 wherein the tape tension varying means includes an electromagnetic device effectively responsive to the output signal and coupled to vary tape tension in response to current flow therethrough;

means for sensing current flow through the electromagnetic device; and means responsive to the sensed current flow for maintaining a minimum current through the electromagnetic device throughout tape tension control thereby.

3. The skew corrector as claimed in claim 2 wherein the video tape playback device has a tape supply reel with a brake coupled thereto for maintaining tape tension for skew control;

said electromagnetic device being a rotary solenoid coupled to the brake for tape tension control;

said means for maintaining a minimum current including a reference signal source representative of the desired minimum current through the rotary solenoid, and a comparator responsive to both the reference signal and the sensed current signal to deliver a control signal to the rotary solenoid to maintain a minimum braking action of said brake upon the tape supply reel.

4. The skew corrector as claimed in claim 2 and further including an emergency control switch coupled to interrupt tape tension control by the output signal and increase the minimum current flow through the electromagnetic device to a preselected level for emergency tape tension control.

5. The skew corrector as claimed in claim 1 wherein the inhibit means further includes an inhibit monostable network producing a variable length output pulse in response to horizontal sync pulses, said inhibit monostable network producing an extended output pulse when actuated by equalizing sync pulses occurring at the end of video fields; and an inhibit network coupled to the horizontal sample and hold network and responsive to horizontal sync pulses and the inhibit monostable output pulse for enabling the horizontal sample and hold network during normal horizontal sync pulses and inhibiting the horizontal sample and hold network during the equalizing pulses.

6. The skew corrector as claimed in claim 5 wherein the means for producing the output signal representative of a tape tension error further includes means producing a skew null signal representative of the desired tension of the video tape;

an operational amplifier responsive to the skew null signal and the tape tension error output signal for generating said output signal representative of the difference therebetween to vary the tape tension in a direction towards said skew null reference level.

7. The skew corrector as claimed in claim 6 wherein the skew null signal producing means is a manually adjustable potentiometer.

8. The skew corrector as claimed in claim 5 wherein the tape tension error signal producing means further includes a second sample and hold network coupled to the horizontal error signal and actuated by vertical sync signals for generating and storing a tape tension error signal operative for a video field to control video tape tension.

9. The skew corrector as claimed in claim 8 wherein the video tape playback device includes a tape tension varying element, and wherein said tape tension varying means includes a rotary solenoid, a linkage operative between the rotary solenoid and the video tape tension varying element, said rotary solenoid being coupled to the output signal for said tape tension control.

10. The skew corrector as claimed in claim 9 wherein said horizontal error signal generating means further includes a ramp generator; and a ramp and retrace monostable pulse generator responsive to pulses from the variable frequency pulse generator and coupled to drive the ramp generator, said ramp generator being coupled to the horizontal sample and hold network for sampling thereby upon occurrence of the horizontal sync pulses.

* * * * *